United States Patent Office 3,519,437
Patented July 7, 1970

3,519,437
MEAT FLAVOR COMPOSITIONS
Christopher Giacino, Upper Nyack, N.Y., assignor to International Flavors & Fragrances Inc., New York, N.Y., a corporation of New York
No Drawing. Filed Feb. 6, 1967, Ser. No. 614,036
Int. Cl. A23l 1/22
U.S. Cl. 99—140                                     14 Claims

ABSTRACT OF THE DISCLOSURE

Flavor compositions are obtained from a reaction product between 2-aminoethane sulfonic acid and thiamine, and optional additional ingredients such as a source of amino acids. Sources of amino acids are illustrated by proteins, hydrolyzed proteins, free amino acids and the like.

---

This invention relates to novel artificial meaty flavoring compositions and to processes for preparing them. More specifically, it relates to novel compositions having meaty flavor characteristics such as beef, pork and poultry flavor, compositions from which they may be prepared, methods for preparing them and to novel food compositions containing them.

Food products enhanced with meat-like flavors are well-known and have long been used. There is considerable demand for meat-flavored products in which the actual meat such as beef, pork, chicken, turkey, duck and the like is not needed or is actually undesirable. For example, in the preparation of some sauces, bouillons, broths and purees, the meat flavor is desired, but it is necessary to cook the food with the desired meat and then to remove the meat by straining or some similar operation to obtain the final product ready for use.

Additionally, where weight space or storage capability are a problem, e.g., when a convenience food is prepared, the presence of the actual meat may be undesirable because it will deteriorate in storage and spoil the food. Moreover, there are occasions when sterilizing or otherwise preserving the natural product is extremely deleterious to the flavor of the natural material and the desired natural flavor is lost. There are additionally those instances where the presence of the natural meat is desirable, but wherein because of cost factors, convenience or the like, consumer acceptance dictates in favor of enhancing the meat flavor already present. Artificial meat flavoring compositions would be eminently suited for this purpose if essentially true flavor reproduction and enhancement could be achieved. Prior attempts at preparing artificial meat flavor compositions have centered, to a large extent, around utilizing a spectrum of spices as in the case of attempting to simulate poultry flavor, or the use of meat extracts, in the case of beef flavor compositions. Such methods have not been entirely satisfactory, in that true flavor is generally not achieved in the case of spice formulations, whereas with extracts, cost and processing disadvantages are encountered.

It has now been discovered that when a pre-mix composition comprising 2-amino ethane sulfonic acid, also known as taurine, and thiamine is heated at an elevated temperature, there results a reaction mixture having a decided, marked meat flavor and which can be employed in a variety of ways. For example it can be used per se in a wide range of food stuffs, either as the dominant flavoring agent or as an aid in improving and enhancing existing flavor. It can serve as the basic flavor composition to which are added a variety of materials either before or after reaction or even re-reacted in the presence of such materials as hereinafter more specifically set forth. This invention contemplates, therefore, the novel flavor compositions produced therefrom, the novel composition used to prepare the flavor compositions, and the novel processes for making them. It contemplates also novel food products containing them.

As described above, the invention, in its broad aspect involves heating a mix composition comprising taurine and thiamine at an elevated temperature for a period of time whereby a meaty flavor is developed. It is to be noted that the pre-mix composition per se, possesses no meaty characteristics and hence the invention may be regarded as being in the discovery that taurine has the ability to impart these characteristics when employed as a reactive component.

The pre-mix composition will result in meaty flavor characteristics after heat treatment as long as both taurine and thiamine are present. In general, suitable pre-mix compositions will comprise from 0.025 to 90 weight percent taurine and from 0.025 to 50 weight percent thiamine, based on the total weight of the pre-mix composition. It is generally preferred to use 0.5 to 5 parts of taurine per part of thiamine, although values outside this range may be employed.

In practice, it is usually preferred to incorporate within the pre-mix composition a vehicle which includes materials such as water, edible oils or fats or the like to provide a medium for the reaction, in addition to other flavor adjuvants such as extenders, distribution agents and the like as will be described in more detail hereinafter. For ease of processing, it is convenient to supply the vehicle in major amounts such that the pre-mix composition, based on the total weight thereof, comprises from 0.1 to 25, preferably 0.3 to 15 weight percent taurine and 0.1 to 15, preferably 0.3 to 10 weight percent thiamine. Lower or higher concentrations may be selected as desired since the characteristics of the composition may vary depending upon the nature and quantity of the vehicles employed.

Various other materials and ingredients can be incorporated into the compositions to provide a variety of flavor characteristics built upon the basic flavor of the taurine-thiamine reaction product. They can be added at any time, that is, before or after heat treatment, or at any stage in between. If added after the heat treatment they will thus be available for further reaction by the large food processor or the ultimate consumer. The nature and quality of such materials will vary depending on individual preferences. As noted, the basic reaction mixture is a composition which has a marked meat flavor and which can be utilized to develop meat flavors ranging from beef through pork to poultry such as chicken, turkey, duck and the like.

In general, development of a variety of flavors is achieved in separate compositions by providing in the pre-mix, or in the reacted composition, a quantity of a source of one or more amino acids such as one or more free amino acids, proteinaceous materials, such as proteins, polypeptides and the like in which the amino acids are bound, or the partial or complete hydrolysates or autolysates thereof, or in which the amino acids are partially or completely free. By varying the type and proportion of amino acid bearing materials this variety is conveniently obtained. Generally, suitable results are obtained when the free amino acid, or mixture of free amino acids, or the proteinaceous material, or any combination of these are included preferably in the pre-mix, prior to reaction, but also in the reacted mix, at levels ranging up to about 50% by weight based on the total weight of the composition. In a preferred embodiment, wherein a vehicle or carrier is employed to aid in carrying out the reaction, the range is conveniently from 0.5 to about 35 percent by weight of the total composition. The actual amounts employed will generally vary depending upon the type of flavor desired.

As "proteinaceous materials" there may be used an edible protein, an edible protein hydrolysate, autolysate, or mixtures thereof which may contain some free amino acids together with various protein derivatives such as proteoses, peptone, polypeptides and dipeptides. Among the proteins which may be used are albumins, globulins, gluteline, prolamines, albuminoids, histrones, protamines, nucleoproteins, glycoproteins, phosphoproteins, chromoproteins and lipoproteins. These may be used in the natural state, e.g., as meat or meat scraps or other meat protein concentrates. Vegetable derived proteins are preferred however. It may also be convenient to employ the hydrolysates or autolysates obtained at various stages of peptide degradation. Thus a source need not be completely hydrolyzed to be effectively employed.

It has been discovered that development of beef flavor is especially aided when the amino acid or mixtures of amino acids or proteinaceous material is relatively low in certain amino acids such as phenylalanine. Suitable materials are hydrolyzed proteinaceous substances illustrated by animal, fish or vegetable hydrolysates. Vegetable hydrolysates, such as those obtained from corn, wheat, yeast and the like are preferred. The hydrolysates may contain carbohydrate materials or not, as desired. As indicated, these can be added to the pre-mix of taurine and thiamine therein to constitute a reaction component, or they can be added to the reacted mixture and thus be available for further reaction either by the food processor or the ultimate consumer. It will be appreciated by those skilled in the art that variations in flavor can be obtained by altering both the proportions and kind of amino acids employed. This will largely depend upon the personal preferences of the processor in consideration of what is thought most likely to appeal to the consumer. Since entirely subjective considerations are involved, it is not possible to be more precise as to the nature and quality of the flavor ultimately produced. Hence the discussion herein may be considered as setting forth general guidelines with indications of preferred compositions to achieve generally acceptable flavor compositions.

There may be additionally present in the pre-mix composition small quantities of a sulfur containing amino acid such as cysteine ranging in amounts from 0.1 to 2 times the weight of taurine employed, although the use of such is not necessary. In fact, as will be discussed more fully hereinafter, it is an added benefit of the invention that the presence of taurine tends to diminish whatever benefit cysteine would contribute, such as to make the latter not a necessary ingredient.

When sweet meaty flavors such as pork and poultry flavors are desired, good results are obtained when either the pre-mix or reaction product, but preferably the pre-mix, is altered to include, as the source of amino acid a polypeptide, preferably a sulfur containing polypeptide or at least one, but preferably a mixture of the amino acid constituents of said polypeptide. It is important to emphasize at this point that the taurine-thiamine reaction mixture is perfectly well suited, without the inclusion of additional ingredients to be used as a meat flavor imparting agent in its own right or as a flavor enhancer when added to foods already having meat flavor. The modification described herein, wherein additional ingredients, in the form of various amino acid containing materials are provided in the compositions, are directed to refinements in the basic flavor compositions.

As polypeptides there may be employed a lower polypeptide such as a dipeptide or tripeptide. By "sulfur containing" is meant that at least one of the bound amino acid components of said polypeptide contains sulfur. Glutathione is especially useful as a sulfur-containing polypeptide in the present invention. In lieu thereof, there may be employed a mixture of the amino acid constituents of the polypeptide. For example, glycine glutamic acid and cysteine (the sulfur-bearing amino acid), are the constituent amino acids of glutathione and may be used in admixture in varying proportions.

It is an added discovery of the present invention, that the taurine in the basic reaction mixture may be used as the sulfur containing amino acid and thus partially or completely replace the cysteine. It is preferred to use a mixture of the constituent amino acids rather than the polypeptide itself, although each amino acid need not be present in said mixture in the same proportion in which it is present in the polypeptide. Thus, while equal parts of glycine, cysteine, and glutamic acid are produced from glutathione, mixtures of varying amounts of the constituent amino acids, such as, for example, mixtures comprising one part of glycine, 0.05 to 20 parts of cysteine, and 0.05 to 10 parts of glutamic acid can be utilized. A preferred mixture comprises one part each of glycine and glutamic acid per 1 to 3 parts of cysteine. Although the benefits of the invention will be obtained when either the glycine or glutamic acid are omitted, it is preferred that they be present in the system. When the amino acid mixtures is used in this invention, cysteine can be replaced by cystine, or other sulfur containing amino acids and, each, in accordance with a further aspect of the present invention as alluded to above and as discussed more fully hereinafter, can be either partially or completely replaced by taurine.

The pre-mix compositions of the present invention which are reacted to produce meaty flavor reaction mixtures thus, preferably contain taurine, thiamine and a source of amino acids which may be any of a free amino acid or mixture of amino acids or proteinaceous materials such as polypeptides, proteins per se, or hydrolysates, and autolysates of these, and the like.

The taurine, as a reacted component with at least the thiamine and preferably with the source of amino acids is effective to produce a reacted composition having flavor characteristics. This effect is not noted when the taurine is added directly to an already reacted mixture, i.e., when it is used as an additive rather than a reacted component. In such instances the resulting composition, to which taurine has been added, takes on sour and astringent notes rather than meaty notes. It is within the contemplation of the invention, however, that such compositions may be further reacted, as by a food processor or the ultimate consumer, to utilize the taurine as a reactive component.

Under some circumstances, it has been regarded as being highly desirable if not essential, to include cysteine in food flavor compositions. The present invention, however, is effective essentially completely to eliminate this requirement, although the compositions of the invention are amenable to the inclusion of cysteine as seen fit by the individual processors. With further regard to the amount of amino acid source to be employed in the compositions of the present invention, when a polypeptide is utilized it is suitably employed at levels of from 0.1 to 15 and preferably 0.5 to 10 weight percent based on the total weight of a vehicle containing composition. The most preferred sweet meat or poultry flavor compositions of the present invention are those wherein the polypeptide is employed not as a discrete compound, rather in the form of a mixture containing at least one of its constituent amino acids, as previously described. Thus pre-mix compositions containing up to 40 weight percent cysteine, up to 25 weight percent of that of glycine and glutamic acid will yield suitable flavor compositions upon reaction with the thiamine-taurine basic mixture. Viewed in the overall, such compositions prior to reaction suitably comprise:

0.025 to 50 weight percent thiamine,
0.025 to 90 weight percent taurine,
0 to 50 weight percent hydrolyzed protein,
0 to 40 weight percent cysteine,
0 to 25 weight percent glycine, and
0 to 25 weight percent glutamic acid.

Particularly suitable are mixtures comprising:

0.1 to 15 and preferably 0.5 to 10 weight percent thiamine,
0.1 to 25 and preferably 0.5 to 25 weight percent taurine,
0 to 40 and preferably 0.5 to 35 weight percent hydrolysed protein,
0 to 5 and preferably 0 to 2.5 weight percent cysteine,
0 to 5 and preferably 0.1 to 2.5 weight percent glycine,
0 to 5 and preferably 0.1 to 2.5 weight percent glutamic acid, with the remainder being a vehicle including flavor adjuvants and the like as hereinafter more fully described. As indicated, the specific additional ingredient and the amount thereof will vary according to type of flavor desired. For beef flavors the hydrolyzed protein and possibly small amounts of cysteine may be employed whereas for pork and poultry the mixture of pure amino acids is more desirable than the use of the complex mixture afforded by the hydrolyzed protein.

It has been found, in preparing the reaction products of this invention, that the ingredients are desirably heated in a vehicle such as water, a triglyceride fat, natural fat, vegetable fat or the like. A triglyceride fat is preferred in the case of pork or poultry flavor compositions whereas water is preferred for beef formulations. The vehicle may constitute as much as 95 percent by weight or more and as little as 10 percent by weight or less of the total weight of the pre-mix to be reacted. Suitable results are obtained, however, at levels ranging from 50 to 90%. Triglyceride fats such as esters (generally triesters) of glycerol with fatty acids, the fatty acids predominantly ranging in carbon chain length from about ten carbon atoms to about twenty-two carbon atoms, may be employed. The term triglyceride fat will be understood to mean both fats and oils. It is preferred that the triglyceride fats be refined, bleached, and deodorized. They can be in their natural form or they can be hydrogenated.

The pre-mix and reacted mixture can also contain other ingredients normally used in this art, such as salt, carbohydrates, flavor adjuvants such as carbonyl compounds, nucleotides, binding or drying agents such as gum arabic and the like. Lower alkyl carbonylic materials such as ketones and alkyl aldehydes can be admixed in the system prior to the heating to produce the reaction mixture or they can be added to the reaction product. It is generally preferred to use these in the poultry systems and to add them after heating the system since they are generally volatile, and losses thereof may occur during the heating.

The ketonic materials used in this aspect of the invention are preferably lower alkanones and hydroxy-substituted alkanones containing from about 4 to 8 non-quaternary carbon atoms such as diacetyl, acetylmethylcarbinol and acetylpropionyl. The alkyl aldehydes are preferably the lower aldehydes containing from about 5 to 8 carbon atoms. Especially preferred are pentanal, hexanal and heptanal. Conveniently, these are employed at levels ranging from 0.01 to 1 times the weight of taurine employed. There may also be added to the reaction mixture quantities of nucleotides and other amino acids, such as beta-alanine. The preferred nucleotides are mixtures of disodium inosinate and disodium guanylate.

It will be understood that all of the ingredients utilized herein can be admixed with inert carriers, or added in the form in which they are commercially available, or in pure form. The thiamine is conveniently used as an acid addition salt, such as a hydrohalide, and preferably, as the hydrochloride. Thiamine containing materials such as yeast and other natural products can be used as the source of thiamine. Similarly, when individual amino acids are utilized they can be in the form of a substance which will yield them under the reaction conditions, such as the acid addition salts, preferably the hydrochloride.

In accordance with an additional aspect of the invention, there may be added to the pre-mix a quantity of a saccharide material such as a mono saccharide or a polysaccharide exemplified by di- and trisaccharides. Ribose, surcrose, dextrose and xylose are illustrative of those which may be employed. The presence of the saccharides results in a reacted composition having somewhat more intense flavor characteristics. Care should be exercized in utilizing these materials, however, since they may tend to contribute some burnt notes to the final reacted product. When used, suitable results are obtained at levels ranging up to about 25 percent by weight based on the total weight of a vehicle-containing pre-reacted system. Preferably, the range is from 0.5–5 weight percent.

The meat flavor of the compositions of the present invention is developed by heating the pre-mix compositions at an elevated temperature for a period of time. The time and temperature are interrelated, longer times being required at low temperatures for best flavor development and shorter times for higher temperatures. It is preferable to utilize temperatures of at least 200° F. in order to accomplish the reaction in a reasonable length of time. Generally, temperatures much above 420° F. make the reaction difficult to control and may well produce uncharacteristic burnt notes even with very short reaction times. Accordingly, it is preferred to carry out the reaction at temperatures of from about 200° F. to about 420° F., until the desired flavor development is achieved. The heating periods may range from about one-quarter minute to about 6 hours depending upon the heating method used.

The process can be carried out on a batch basis in smal quantities of, for example, 50–100 grams or it can be carried out batch-wise on much larger quantities of 500 kg. or more.

The preferred process of this invention relative to producing beef flavor compositions involves refluxing an aqueous pre-mix. It is most convenient to reflux the aqueous mixture for a period of from one to six hours. Longer periods may be used at less than reflux temperature, and shorter periods may be used when the treatment is carried out under pressure at higher than reflux temperature. After reaction, the product is cooled and preferably allowed to age for a period of from 2 to 4 days. It may then be dried as for example by taking it up in a binding agent such as gum arabic or the like.

For sweet meat and poultry flavors, it is preferred to conduct the heating continuously in high heat transfer-rate heat exchangers. With such exchangers the reaction mixture can quickly be brought to the reaction temperature and then quickly cooled in a second exchanger to a lower temperature at which no further reaction will take place. A preferred embodiment of this invention utilizes a scraped-wall heat exchanger. Generally, higher temperatures can be used in high heat exchangers than can be used in batch production. The use of temperatures at the upper end of the range in batch production tends to cause localized overheating, rapid reaction and off-flavors and odors. A preferred temperature range for both batch and continuous processes is from about 250° to about 400° F.

The appropriate time of heating can readily be determined by observation of the flavor produced. The reaction is sufficiently easy to control that the proper extent of heating can readily be determined simply by heating the reaction mixture for a sufficient period to produce the desired poultry flavor. Generally, it is preferred to utilize heating times on the order of from about one-quarter minute to about three hours. Shorter times on the order of from about one-quarter to about three minutes at 250°–400° F. are preferably used in high heat transfer-rate heat exchangers. Where the flavor composition of this invention is added to a food which is to be subsequently heated or cooked, the reaction time can be reduced, and in some of these cases, heating the pre-mix independently of the food can even be eliminated.

That is the processor or the ultimate consumer in effect conducts the reaction.

The use of high heat transfer equipment may tend to cause burnt notes uncharacteristic of the true pork or poultry flavor. To aid in avoiding this, it has been found convenient to use distributing agent, salt or a carbohydrate for example, but preferably salt, in the system. The salt is conveniently admixed with the other ingredients prior to reaction at a level of about 10 to 30 weight percent based on the weight of the entire composition. It may thus be considered as part of the vehicle. It then serves as a means for distributing the system uniformly through the heat transfer equipment thereby minimizing the potential local hot spot effects.

The flavor compositions of this invention can be used to flavor various foods, liquid or dry. They are conveniently employed at levels of for example, from 0.05 to 15 weight percent. For example, they can be incorporated into gravies, sauces, soups, dressings, salads, aspics, purees and other liquid preparations at levels of from 0.05 to 2 and preferably from 0.1 to 1 weight percent. On the other hand, they can be admixed with carrier materials or with other flavoring ingredients or foodstuffs for incorporation into finished products, illustrative of which are the dry foods such as snacks, chips, synthetic meat fibres and the like. The compositions are conveniently employed at levels of 2 to 15 weight percent or more and preferably 5 to 10 weight percent in such applications. It will be understood that the concentration ranges are given for purposes of illustration only. It is well within the skill of the art to utilize as much or as little additional ingredients, foods and the like, in the compositions of the invention in order to obtain varieties of flavor, additional notes and the like. The important consideration is that the basic flavor development is the result of a taurine-thiamine reaction product augmented as desired by a source of amino acids, as herein discussed.

The following examples are intended to be illustrative of the invention.

EXAMPLE I

The following ingredients are selected:

| Ingredients: | Parts by weight |
|---|---|
| Fat (vegetable shortening) | 622.67 |
| Salt | 321.65 |
| Glutamic acid | 5.14 |
| L-cysteine hydrochloride | 10.28 |
| Glycine | 5.14 |
| Beta-alanine | 1.28 |
| Thiamine hydrochloride | 10.28 |
| Taurine | 20.00 |
| Mixture of disodium inosinate and disodium guanylate | 3.34 |

The foregoing ingredients are mixed and the mixture continuously introduced into a high heat transfer-rate scraped wall heat exchanger wherein it is heated for about 30 seconds at a temperature of about 300° F.

The mixture, which has taken on a yellow color, is then cooled to about 100° F. in a second scraped wall heat exchanger and thereafter 0.12 part of diacetyl and 0.10 part of hexanal are added, and the resulting mixture is then blended into a paste. The mixture has an excellent chicken flavor definitely enhanced over that obtained when the taurine is omitted. In the foregoing reaction mixture, the cysteine can be substituted by cystine or glutathione with excellent results. By varying the proportions of the individual ingredients, a number of different poultry flavor notes can be produced. Other types of sweet meaty flavor notes, pork flavors, for example, can also be produced by substituting the fat with lard and slightly decreasing the reaction time. The edible compositions so produced can be combined with other flavor ingredients such as smoky materials to give a bacon flavor or spices to produce a ham flavor or a sausage flavor. When the foregoing procedure is repeated utilizing only the thiamine, taurine, fat and salt, an acceptable poultry flavor composition is obtained in which the flavor is somewhat less intense than that obtained from all ingredients.

EXAMPLE II

In the foregoing example, the taurine is employed at a level of approximately 2 weight percent. When the procedure is repeated at levels of 0.1, 4, 8 and 20 weight percent taurine (the fat levels being reduced correspondingly) similar improvements in flavor enhancement are noted:

EXAMPLE III

This example is illustrative of a chicken flavor composition produced when 50% of the cysteine used in Example I is replaced with taurine.

| Ingredient: | Parts by weight |
|---|---|
| Fat | 622.67 |
| Salt | 321.65 |
| Beta-alanine | 1.28 |
| Glutamic acid | 5.14 |
| Glycine | 5.14 |
| Thiamine hydrochloride | 10.28 |
| Mixture of disodium inosinate and disodium guanylate | 3.24 |
| L-cysteine hydrochloride | 5.14 |
| Taurine | 5.14 |

The procedure of Example I is followed, using the above ingredients, to produce a composition having chicken flavor characteristics virtually indistinguishable from that obtained when taurine is omitted and the cysteine is used at twice the level shown above. Similar results are obtained when the procedure is repeated batchwise in an open vessel at a temperature of between 350 to 390° F. for a period of 10–15 minutes.

EXAMPLE IV

This example is illustrative of a chicken flavor composition produced when all of the cysteine used in Example I is replaced by taurine.

| Ingredient: | Parts by weight |
|---|---|
| Fat | 622.67 |
| Salt | 321.65 |
| Glutamic acid | 5.14 |
| Taurine | 10.28 |
| Beta-alanine | 1.28 |
| Glycine | 5.14 |
| Thiamine hydrochloride | 10.28 |
| Mixture of disodium inosinate and disodium guanylate | 3.34 |

The above ingredients are mixed and the mixture continuously fed to a scraped-wall heat exchanger wherein it is heated for one-half minute at 325° F. It is then immediately cooled to 100° F. in a second scraped-wall heat exchanger after which 0.12 part of diacetyl and 0.10 part of hexanal are added. The resulting mixture has very good chicken flavor characteristics and is suitable for use in gravies, sauces, soups and the like.

When the foregoing procedure is repeated utilizing ten parts glucose in the mixture to be reacted, a reaction mixture having very good chicken flavor is obtained.

EXAMPLE V

The following mixture is prepared:

| Ingredient: | Parts by weight |
|---|---|
| Fat | 622.67 |
| Salt | 321.61 |
| Glutathione | 10.00 |
| Beta-alanine | 1.28 |
| Thiamine hydrochloride | 10.28 |
| Taurine | 10.00 |
| Mixture of sodium inosinate and sodium guanylate | 3.34 |

The procedure of Example I is followed, and after cooling, 0.12 part of diacetyl and 0.10 part of hexanal (50% pure) are added. The mixture so produced has a very good chicken flavor.

Novel edible food compositions of this invention comprise a food and the flavor compositions prepared as described above. If desired, the flavor composition can be admixed directly with the food, or it can first be blended with other food additives and then admixed with the food. Additives suitable for admixture with the flavor compositions of this invention include carriers, thickeners, condiments, spices, encapsulating agents, vehicles, coloring agents, other flavoring materials, flavor intensifiers, and the like. For example, the flavor compositions of this invention can be admixed with food additives such as alginates, allspice, ascorbic acid, basil, capsicum extract, organo extract, pyroligneous acid, sage oil, sodium citrate, thyme, monosodium glutamate, and the like.

Carriers are useful in extending the flavor compositions of this invention. Such carriers do not appreciably affect the quality of the flavor, but they frequently stabilize the compositions and increase their shelf life. Saccharides such as gum arabic are useful for this purpose, as are mixtures of salts and suitable carbohydrates such as karaya, tragacanth, carboxymethylcellulose, and the like.

In formulating the edible compositions according to this invention, a small but effective amount of the flavor composition is added to the food to impart a chicken, turkey, duckling, pork, or other sweet-type meat flavor. The novel flavor compositions of this invention will also enhance such flavors in foods which already possess a meaty flavor. It will be understood that the amount of flavor composition used depends upon a variety of factors, and accordingly, can vary over a wide range. The factors which determine the amount of flavor composition of this invention to be used include the intensity of flavor desired, the specific reaction mixture, the reaction conditions, the type of food to which it is added, and the cooking or other treatment to which the total edible composition will be subjected prior to consumption. The flavor composition of this invention can be added to meat-containing or to meatless foods. For example, it can be added to beef, lamb, pork, chicken, turkey, duckling, and the like, or to gravies, ragouts, soups, fricassees, spreads, dips, salads, pot pies, dressings, sauces, pates, purees, snack products such as crackers, marinades, and the like.

Experiments similar to the foregoing examples demonstrate that no meat flavor composition is obtained when hydrolyzed vegetable protein is refluxed for 4 hours in an aqueous medium.

Similarly, a mixture of the following ingredients is blended with 400 parts of vegetable shortening (Crisco) and 161 parts of sodium chloride:

| Ingredient: | Parts by weight |
|---|---|
| Glutamic acid | 5.14 |
| Glycine | 5.14 |
| Beta-alanine | 1.28 |

The mixture is heated to a temperature of about 275° F. over a period of approximately 8 minutes and then cooled quickly to about 100° F. Thereafter, 0.1 part hexanal (50%), 3.34 parts nucleotides and 0.12 part diacetyl are added. The resulting mixture does not possess meaty flavor characteristics.

EXAMPLE VI

The following ingredients are refluxed for four hours. The resulting mixture is then aged for three days and gum arabic added thereto to provide a composition containing one part by weight of flavor solids and one part by weight of gum arabic. The composition is spray dried to produce a beef flavor product.

| Ingredient: | Parts by weight |
|---|---|
| L-cysteine hydrochloride | 3.52 |
| Hydrolyzed vegetable protein | 154.70 |
| Thiamine hydrochloride | 3.52 |
| Water | 336.50 |
| Taurine | 10.00 |

The flavor of this composition is decidedly improved over that obtained when the procedure is repeated without using taurine. When the foregoing procedure is repeated utilizing the taurine at concentrations of 0.1, 4, 8 and 20 percent by weight, similar results are obtained.

EXAMPLE VII

The procedure of Example VI is repeated utilizing 1.72 parts of each of taurine and L-cysteine hydrochloride. The resulting reaction product has a beef flavor virtually indistinguishable from the product obtained in Example VI when taurine is absent.

EXAMPLE VIII

The procedure of Example VI is followed utilizing the following ingredients:

| Ingredient: | Parts by weight |
|---|---|
| Taurine | 3.52 |
| Thiamine hydrochloride | 3.52 |
| Water | 336.50 |
| Hydrolyzed vegetable protein | 154.70 |

The resulting composition has very good beef flavor characteristics. When the procedure is repeated omitting the hydrolyzed vegetable protein, again a good meat flavor composition is obtained.

Other ingredients may be added, before or after reaction to the pre-mix composition of Examples VI–VIII to impart special notes to the product. For example, materials such as phenylalanine, beta-alanine, pyruvic acid, pyruvic aldehyde, phosphoric acid, potassium phosphate (dibasic), ammonium phosphate (dibasic), potassium chloride and the like may be employed.

EXAMPLE IX

The following ingredients are used to prepare a beef bouillon cake:

| Ingredient: | Gms./unit |
|---|---|
| Salt | 1.80 |
| Flavor compositions of Example VIII | 0.50 |
| Gelatin (180 bloom) | 0.40 |
| Mono-sodium glutamate | 0.20 |
| Brown coloring | 0.01 |
| Garlic powder | 0.04 |
| Pepper, ground | 0.01 |
| | 2.96 |

A bouillon having excellent beef flavor is obtained.

EXAMPLE X

A chicken-flavored bouillon mix is prepared by admixing the following ingredients:

| Ingredient: | Parts by weight |
|---|---|
| Salt—fine | 1.50 |
| Malto-dextrin | 1.10 |
| Monosodium glutamate | 0.40 |
| Vegetable protein hydrolysate | 0.40 |
| Onion flavor | 0.17 |
| Celery stalk powder | 0.10 |
| Celery seed powder | 0.03 |
| Garlic powder | 0.02 |
| White pepper powder | 0.02 |
| Chicken flavor of Example III | 0.50 |

If desired, coloring material can be added to the foregoing mix to obtain the desired shade.

A bouillon is prepared from the foregoing composition by adding 40 parts of boiling water to the mix and stirring to disperse the ingredients. A bouillon having an excellent chicken flavor is obtained.

EXAMPLE XI

A mix for the preparation of chicken-flavored gravy is prepared by blending the following ingredients:

| Ingredient: | Parts by weight |
|---|---|
| All-purpose flour | 360.0 |
| Cornstarch | 120.0 |
| Non-fat dry milk solids | 80.0 |
| Dextrose | 40.0 |
| Chicken flavor of Example IV | 270.0 |
| Monosodium glutamate | 40.0 |
| Onion powder | 16.0 |
| Celery stalk powder | 4.0 |
| Chicken spice | 8.0 |

About 9.7 parts of the gravy mix is thoroughly dispersed in 100 parts of cold water. The dispersion is then brought to a boil and simmered for two minutes. A gravy having an excellent chicken flavor is obtained.

What is claimed is:

1. A process for altering the flavor of a food which comprises incorporating a small but effective amount of a reaction product formed by heating at elevated temperatures a mixture comprising 2-aminoethane sulfonic acid and thiamine.

2. A process as defined in claim 1 wherein said mixture also contains a source of one or more amino acids.

3. A process as defined in claim 2 wherein said source of amino acid is hydrolyzed vegetable protein.

4. A process as defined in claim 2 wherein said source of amino acid is glycine, cysteine or glutamic acid.

5. A process as defined in claim 1 wherein the heating is carried out within the range of from about 200–420° F.

6. A process as defined in claim 5 wherein the heating is carried out for a period of from about 15 seconds to about 6 hours.

7. An edible composition comprising a food and an additional amount of a reaction product obtained by heating at an elevated temperature a mixture comprising 2-aminoethane sulfonic acid and thiamine, said product being present in an amount sufficient to alter the flavor of said food.

8. An edible composition as defined in claim 7, wherein said mixture also contains a source of one or more amino acids.

9. An edible composition as defined in claim 8 wherein said source of amino acid is hydrolyzed vegetable protein.

10. An edible composition as defined in claim 8 wherein said source of amino acid is glycine, cysteine or glutamic acid.

11. A composition for improving the meat flavor of a food which comprises:
 (i) a reaction product obtained by heating a mixture compring 2-aminoethane sulfonic acid and thiamine at elevated temperature, and
 (ii) a thickener, condiment, flavoring intensifier, or flavoring adjuvant.

12. A composition as defined in claim 11 wherein the heating is carried out at a temperature of from about 200°–420° F. in an aqueous or fat vehicle.

13. A composition as defined in claim 12 wherein said mixture heated also contains a source of one or more amino acids.

14. A composition as defined in claim 13 wherein said source of amino acid is protein hydrolysate, glycine, cysteine, or glutamic acid.

References Cited

UNITED STATES PATENTS

| 3,394,015 | 7/1968 | Giacino | 99—140 |
| 3,394,016 | 7/1968 | Bidmead et al. | 99—140 |

OTHER REFERENCES

Mecchi et al., "Origin of Hydrogen Sulfide in Heated Chicken Muscle," Journal of Food Science, vol. 29, pp. 393–399 (1964).

Tanaka et al., "Effects of Taurine on the Stabilization of Thiamine," Chem. Abstracts, vol. 55, 9788i (1961).

Solov'eva, "The Thiamine Content in Beef and Chicken Meat," Chem. Abstracts, vol. 53, 19206g (1959).

A. LOUIS MONACELL, Primary Examiner

W. BOVEE, Assistant Examiner